United States Patent
Choi et al.

(10) Patent No.: US 8,305,978 B2
(45) Date of Patent: Nov. 6, 2012

(54) ADAPTIVE RESOURCE ALLOCATION METHOD IN A WIRELESS COMMUNICATION SYSTEM AND TRANSCEIVER FOR IMPLEMENTING THE SAME

(75) Inventors: Jin Soo Choi, Anyang-si (KR); Min Seok Oh, Anyang-si (KR); Hyung Ho Park, Anyang-si (KR); Sung Ho Moon, Anyang-si (KR); Jae Hoon Chung, Anyang-si (KR); Doo Hyun Sung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 710 days.

(21) Appl. No.: 12/518,085

(22) PCT Filed: Dec. 18, 2007

(86) PCT No.: PCT/KR2007/006641
§ 371 (c)(1),
(2), (4) Date: Jun. 5, 2009

(87) PCT Pub. No.: WO2008/075884
PCT Pub. Date: Jun. 26, 2008

(65) Prior Publication Data
US 2010/0322161 A1    Dec. 23, 2010

(30) Foreign Application Priority Data
Dec. 18, 2006  (KR) .................. 10-2006-0129555

(51) Int. Cl.
*H04W 4/00* (2009.01)

(52) U.S. Cl. ..... 370/329; 455/450; 455/451; 455/452.1; 455/452.2; 455/453; 455/454; 455/455; 455/456.1

(58) Field of Classification Search .................. 370/329; 455/450–456.1, 464, 509
See application file for complete search history.

(56) References Cited

U.S. PATENT DOCUMENTS

| | | | |
|---|---|---|---|
| 2005/0063345 A1* | 3/2005 | Wu et al. | 370/335 |
| 2005/0074030 A1 | 4/2005 | Cho et al. | |
| 2006/0039318 A1* | 2/2006 | Oh et al. | 370/328 |
| 2006/0126749 A1* | 6/2006 | Armour et al. | 375/260 |
| 2008/0037464 A1* | 2/2008 | Lim et al. | 370/329 |

FOREIGN PATENT DOCUMENTS

| | | |
|---|---|---|
| CN | 1761182 | 4/2006 |
| EP | 1553718 | 7/2005 |
| EP | 1740006 | 1/2007 |
| JP | 11308153 | 11/1999 |
| JP | 2006060814 | 3/2006 |
| JP | 2006246027 | 9/2006 |
| JP | 2006279635 | 10/2006 |
| WO | 2005015797 | 2/2005 |
| WO | 2005064820 | 7/2005 |
| WO | 2006078019 | 7/2006 |

* cited by examiner

*Primary Examiner* — Anh-Vu Ly
*Assistant Examiner* — Mang Yeung
(74) *Attorney, Agent, or Firm* — Lee, Hong, Degerman, Kang & Waimey

(57) ABSTRACT

Methods of allocating data to a plurality of subcarriers in a wireless communication system are disclosed. More specifically, one of the methods includes receiving feedback information from a receiver, calculating a level of mobility of the receiver using the feedback information, determining a resource allocation scheme to use based on the calculated level of mobility, and allocating the data to the plurality of subcarriers based on the determined resource allocation scheme.

18 Claims, 7 Drawing Sheets

FIG. 2A

| D1 | D2 | D3 | D4 | D5 | D6 | D7 | . . . |

FIG. 2B

| D1 | | D2 | | D3 | . . . |

FIG. 2C

| D1 | D2 | D3 | | D4 | D5 | D6 | . . . |

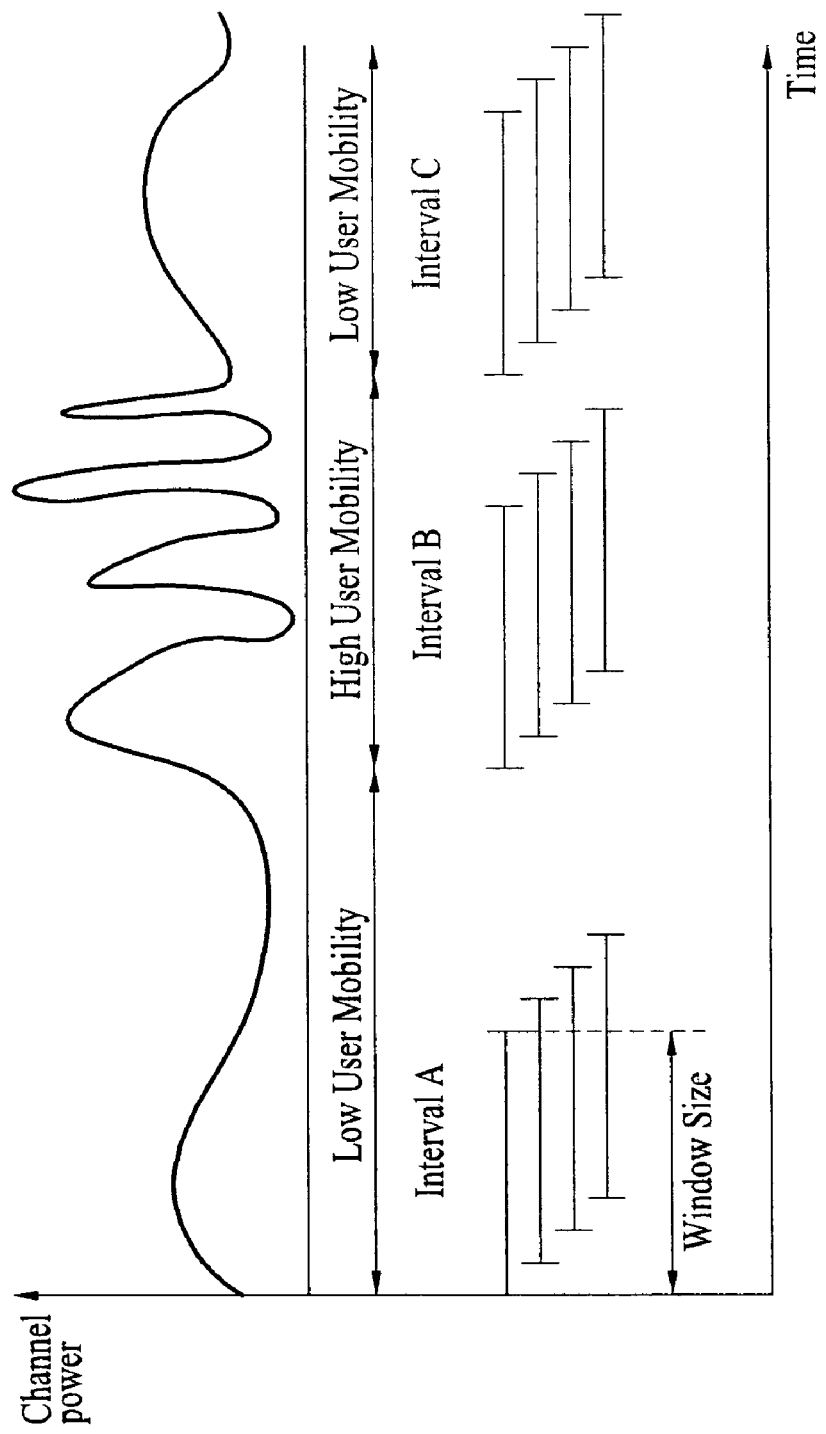

ADAPTIVE RESOURCE ALLOCATION METHOD IN A WIRELESS COMMUNICATION SYSTEM AND TRANSCEIVER FOR IMPLEMENTING THE SAME

CROSS-REFERENCE TO RELATED APPLICATIONS

This application is the National Stage filing under 35 U.S.C. 371 of International Application No. PCT/KR2007/006641, filed on Dec. 18, 2007, which claims the benefit of earlier filing date and right of priority to Korean Application No. 10-2006-0129555, filed on Dec. 18, 2006.

TECHNICAL FIELD

The present invention relates to a resource allocation method, and more particularly, to adaptive resource allocation method in a wireless communication system and transceiver for implementing the same.

BACKGROUND ART

A next generation mobile wireless communication system generally provides a high speed multimedia service. With the use of multimedia service becoming more widespread, wireless communication users' demand and need for faster, more reliable, and better multimedia is growing.

To accommodate such a growing demand, research to provide more efficient and improved service is taking place. In other words, various methods of improving data transmission are being researched, and in particular, ways to improve use of frequency resources are being explored.

More specifically, the research relates to transmitting in parallel a plurality of non-interfering subcarriers so as to address multi-path interference experienced in high speed data transmission systems. For example, an orthogonal frequency division multiplexing (OFDM), which uses overlapping subcarriers, can be implemented to increase frequency efficiency.

In addition, a wireless communication environment and/or channel condition can change as a result of mobility of a mobile station (MS) or simply due to changes in the communication environment. In view of this, it is important to provide reliable data throughput so that the users can continue to experience and enjoy quality of service (QoS).

DISCLOSURE OF THE INVENTION

Accordingly, the present invention is directed to adaptive resource allocation method in a wireless communication system and transceiver for implementing the same that substantially obviates one or more problems due to limitations and disadvantages of the related art.

An object of the present invention is to provide a method of allocating data to a plurality of subcarriers in a wireless communication system.

Another object of the present invention is to provide an apparatus for allocating data to a plurality of subcarriers in a wireless communication system Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of allocating data to a plurality of subcarriers in a wireless communication system includes receiving feedback information from a receiver, calculating a level of mobility of the receiver using the feedback information, determining a resource allocation scheme to use based on the calculated level of mobility, and allocating the data to the plurality of subcarriers based on the determined resource allocation scheme.

In another aspect of the present invention, a method of allocating data to a plurality of subcarriers in a wireless communication system includes receiving feedback information from a receiver, calculating a level of change in channel condition using the feedback information, determining a resource allocation scheme to use based on the calculated level of change in the channel condition, and allocating the data to the plurality of subcarriers based on the determined resource allocation scheme.

In a further aspect of the present invention, an apparatus for allocating data to a plurality of subcarriers in a wireless communication system includes at least one channel encoder configured to add error detection bits to the data, at least one mapper configured to modulate the encoded data, at least one resource allocator configured to allocate resources to transmission symbols, at least one modulator configured to modulate the transmission symbols, a receiver circuit configured to receive signals and send out the received signals in a digital format to a controller, and the controller which includes a comparison module, wherein the comparison module is configured to: receive feedback information from the receiver circuit, calculate a level of mobility of the receiver using the feedback information, determine a resource allocation scheme to use based on the calculated level of mobility, and allocate the data to the plurality of subcarriers based on the determined resource allocation scheme.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 2A illustrates a contiguous allocation method;

FIG. 2B and FIG. 2C illustrate a distributed allocation method and a group allocation method, respectively;

FIG. 3 is an exemplary diagram illustrating a relationship between changes in channel power and the mobility of the receiver with respect to time;

BEST MODE FOR CARRYING OUT THE INVENTION

Figure 1:
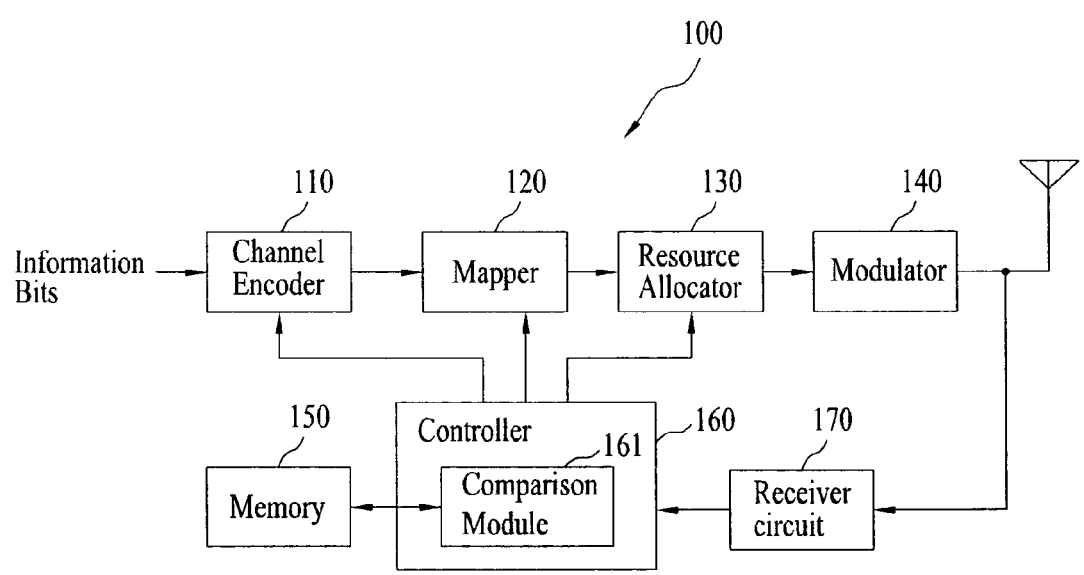
FIG. 1 is an exemplary block diagram illustrating a transmitter.

Reference will now be made in detail to the preferred embodiments of the present invention, examples of which are illustrated in the accompanying drawings. Wherever possible, the same reference numbers will be used throughout the drawings to refer to the same or like parts.

To maintain QoS in a wireless communication system, a link adaptation scheme for changing the transmit parameters can be used. The link adaptation schemes include, for example, a resource allocation which is used to allocate transmit data to subcarriers in a prescribed pattern, a modulation and coding selection (MCS) level index, transmit power, and a spreading factor.

As an example of resource allocation, a contiguous allocation method and a distributed allocation method are available. In the contiguous allocation method, the user data can be allocated to the frequency domain (or the time domain) of the subcarriers. In the distributed allocation method, the user data is distributed across the entire subcarrier bandwidth.

Furthermore, additional link adaptation schemes include an adaptive modulation and coding (AMC), channel dependent scheduling, a hybrid automatic request (H-ARQ), and power control.

If the scope of the user's mobility is small, the contiguous allocation method can be used to allocate the user data, and in addition, the AMC scheme or the channel dependent scheduling scheme can be applied to increase the system's efficiency. Alternatively, if the scope of the user's mobility is large, applying the AMC scheme or the channel dependent scheduling scheme results in inefficiency, and therefore, the distributed allocation method can be used to allocate the user data to achieve frequency diversity gain.

According to the conventional practice, the user data is fixedly allocated to physical channels according to a prescribed allocation method. Consequently, if the degree (or amount) of change in channel condition varies as a result of mobility of the user, it is difficult to dynamically configure the channel correspondingly.

In other words, if the channel condition changes as the location of the user changes, the AMC scheme or the channel dependent scheduling scheme cannot be applied. Moreover, if the contiguous allocation method is used to transmit the user data, in order to use the link adaptation schemes, foregoing frequency diversity gain, the system can experience even greater inefficiency.

As discussed, the system using the distributed allocation method (e.g., used when the user's mobility is small) may experience loss in capability compared to the system using the link adaptation schemes (e.g., AMC and channel dependent scheduling). As a result, it may be difficult to experience optimum system capability in a system using a fixed allocation method since the user's mobility cannot be fully accommodated.

In light of possible problems or difficulties associated with transmitting user data, the following descriptions provide more efficient and effective means for transmitting user data. It is important to point out that the following discussions can be applied to both the downlink and the uplink transmissions. Here, the downlink transmission refers to a transmission from a base station (BS) to a mobile station (MS). Conversely, the uplink transmission refers to a transmission from a MS to a BS.

Generally, the BS refers to a fixed station, and can also be referred to as node B, a base transceiver station (BTS), an access point (AP), a network, and a network entity. The MS can be configured to a fixed point or can be mobile, and can also be referred to as an user equipment (UE), an user terminal (UT), a subscriber station (SS), a wireless device, a mobile subscriber station (MSS), and a terminal.

Further, the discussion to follow can be applied to a single-carrier system as well as a multi-carrier system. In the single-carrier system, various modulation schemes such as a code division multiple access (CDMA) and a single-carrier frequency division multiple access (SC-CDMA) can be used. In the multi-carrier system, various modulation schemes such as OFDM can be used. OFDM uses partitions the bandwidth of the entire system into a plurality of subcarriers (e.g., subband or tone) having orthogonality with each other.

FIG. 1 is an exemplary block diagram illustrating a transmitter. Generally, a communication system comprises a transmitting side (e.g., transmitter) and a receiving side (e.g., receiver). For simplification, the transmitter and the receiver can be referred to as a transceiver.

In the downlink transmission, the transmitter can be a part of the BS, and the receiver can be a part of the MS. Alternatively, the transmitter can be a part of the MS, and the receiver can be a part of the BS. Here, both the BS and the MS can comprise a plurality of transmitters as well as a plurality of receivers.

Referring to FIG. 1, the transmitter 100 can include a channel encoder 110, a mapper 120, a resource allocator 130, a modulator 140, a memory 150, a controller 160, and a receiver circuit 170. More specifically, the channel encoder 110 can receive a stream of information bits and can encode the received bits using a prescribed coding scheme to form coded data. The information bits can include text, audio, video, or other types of data.

Moreover, the channel encoder 110 can add error detection bits, such as a cyclic redundancy check (CRC), to each of the information bits and/or can also add extra bits for error correction code. The error correction code can include turbo code, low density parity check code, and convolution code.

The mapper 120 can modulate the coded data using a prescribed modulation scheme into transmission symbols. To put differently, the coded data can be mapped (or allocated) to transmission symbols represented by phase and constellation. The modulation scheme can include m-quadrature phase shift keying (m-QPSK), m-phase shift keying (m-PSK), m-quadrature amplitude modulation (m-QAM). Here, m-PSK can be a binary phase shift keying (BPSK), QPSK, or 8-PSK. In addition, m-QAM can be 16-QAM, 64-QAM, or 256-QAM.

The resource allocator 130 can allocate the resources to the transmission symbols according to the resource allocation scheme received from the controller 160. The resource allocation scheme can include contiguous allocation method, distributed allocation method, and group allocation method. These schemes can apply frequency (or time) hopping technique, the details of which will be discussed later.

The modulator 140 can modulate the transmission symbols using a multiple access modulation scheme. The multiple access modulation scheme can include a single-carrier modulation scheme such as CDMA or a multi-carrier modulation scheme such as OFDM.

The memory 150 can provide space for temporarily storing feedback channel information and can store a modulation and coding scheme (MCS) lookup table for supporting the AMC scheme according to the contiguous allocation method. The MCS lookup table can include at least one of a list of coding ration to be applied to the information bits, a list of modulation schemes, and a list of MCS level index corresponding to the list of modulation schemes.

The receiver circuit 170 can receive signals transmitted from the transmitter via the antenna and sends (or outputs) the received signal in a digital format to the controller 160. The information outputted from the receiver circuit 170 can include channel quality information (CQI). The CQI refers to feedback information from the receiver to the transmitter 100 regarding channel condition, coding scheme, and/or modulation scheme. More specifically, the CQI includes index information related to power of each channel, signal-to-noise ratio (SNR), signal-to-interference and noise ratio (SINR), coding rate, modulation scheme, and modulation size. Here, the index information can be the MCS level index.

The controller 160 can control the operations of the transmitter 100. The controller 160 can include a comparison module 161 for determining resource allocation method of the subcarriers after calculating the degree of mobility of the receiver. Furthermore, the controller 160 can include an AMC module (not shown) which can be used to refer to the MCS level index and the MCS lookup table to determine the coding rate and the modulation scheme to apply to the inputted information bits.

Lastly, the comparison module 161 can use at least one of changes in the channel, the degree of change in channels, and distributed value of the channel information to calculate the degree or extent of mobility by the receiver (e.g., MS).

Embodiment 1

According to a first embodiment of the present invention, the comparison module 161 can use the level (or amount) of change in the channels to calculate the mobility of the receiver (e.g., MS) in order to determine the resource allocation method to use. As channel information for calculating the level of change in the channel conditions, power, MCS level index, and SNR can be used. This embodiment relates to power of the channel.

FIG. 3 is an exemplary diagram illustrating a relationship between changes in channel power and the mobility of the receiver with respect to time. Referring to FIG. 3, if the degree of mobility of the receiver (e.g., Interval A and Interval C) decreases, the amount of change in the channel power decreases correspondingly. Alternatively, if the degree of mobility of the receiver (e.g., Interval B) increases, the amount of change in the channel power increases as well.

Furthermore, the amount of change in the channel power and the mobility of the receiver (e.g., MS) are mutually proportionate to each other, and with that, the resource allocation method can be determined once the change in power of the channels are calculated.

However, because there is no feedback information regarding the receiver's mobility when the transmission begins, the following two (2) methods can be used to determine the initial resource allocation method.

First, the resource allocation method can be further classified into Method (1) and Method (2). Here, the comparison module 161 can take the channel condition (or communication environment) of the corresponding area (or cell/sector) into consideration and can assign either Method (1) or Method (2) as the initial resource allocation method. The comparison module 161 can assign either Method (1) or Method (2) according to a prescribed or pre-set procedure. Preferably, the initial resource allocation method is assigned based on the allocation method which provides a specified level of communication efficiency without regard to the mobility of the receiver (e.g., MS). For example, the initial resource allocation method can be assigned to a distributed allocation method through which frequency diversity gain can be achieved.

Second, the comparison module 161 can calculate the level of change in channel (e.g., the difference in channels with respect to power) within a specified time window (or time interval) by comparing the power of the channel feedback from the receiver with the power of a previous channel stored in the memory 150. Thereafter, the calculated level of change in channel can be added to the previously accumulated level of change in channel, and the accumulation of the level of change can be continued (or repeated) so as to calculate a level of change in channel in terms of units (hereinafter, "level of change unit"). In addition, an average (or average value) can be calculated by calculating the level of change unit repeatedly for a specified duration (hereinafter referred to as "amount of change in initial power").

Here, the stored channel power level can be represented by previously measured channel power level(s), an average value of a specified number of measured channel power levels, or weighted values (e.g., applying weights to a specified number of measured channel power levels).

The comparison module 161 can select Method (1) as the resource allocation method if the amount of change in initial power is smaller than the threshold value stored in the memory 150. Thereafter, the comparison module 161 can transmit information regarding the selected Method (1) to the resource allocator 130. Alternatively, the comparison module 161 can select Method (2) as the resource allocation method if the amount of change in initial power is larger than the threshold value stored in the memory 150. Thereafter, the comparison module 161 can transmit information regarding the selected Method (2) to the resource allocator 130.

Here, if the amount of change in power is small, preferably, Method (1) can be applied to the contiguous allocation method of FIG. 2A since the transmit efficiency can be increased by applying the AMC scheme or the scheduling scheme. In addition, if the amount of change in power is large, Method (2) can be applied to the distributed allocation method of FIG. 2B since it is advantageous to achieve frequency diversity gain.

However, even a certain level of frequency diversity gain is sacrificed if the amount of change is significant, Method (2) can be applied to the group allocation method of FIG. 2C to decrease the signal overhead which is increased by mobility of the receiver.

Furthermore, if the amount of change in power is large, the contiguous allocation method can be used. However, Method (2) can be applied to hopping scheme (e.g., applied in time and frequency domains) in such a case so as to achieve frequency diversity gain.

The discussions regarding Method (1) and Method (2) can be further applied to the following discussions.

The following is an example of an equation that can be used to determine initial resource allocation method using Method (2).

$$w_1(||h_m|^2-|h_1|^2|)+w_2(||h_{m+1}|^2-|h_2|^2|)+w_3(||h_{m+2}|^2-|h_3|^2|)+\ldots+w_{windowsize-m+1}(||h_{windowsize}|^2-|h_{windowsize-m+1}|^2|)\geq \text{or} \leq \text{threshold}$$ [Equation 1]

Referring to Equation 1, $h_m$ denotes channel power of the $m^{th}$ feedback channel, w denotes weight, and the sum of w is 1. Moreover, m is an integer between 1–window size.

If the MCS level is used as channel information for determining the level of mobility of the receiver, Equation 2 can be used instead of Equation 1.

$$w_1(||MCS_m|^2-|MCS_1|^2|)+w_2(||MCS_{m+1}|^2-|MCS_2|^2|)+\ldots+w_{windowsize-m+1}(||MCS_{window\,size}|^2-|MCS_{window\,size-m+1}|^2 \geq \text{or} \leq \text{threshold}$$ [Equation 2]

Referring to Equation 2, $MCS_m$ denotes the MCS level index of $m^{th}$ feedback channel while the description of w and m is defined with respect to Equation 1.

Further, if the SNR is used as channel information for determining the level of mobility of the receiver, Equation 3 can be used instead of Equation 1.

$$w_1(||SNR_m|^2-|SNR_1|^2|)+w_2(||SNR_{m+1}|^2-|SNR_2|^2|)+\ldots+W_{window\,size-m+1}(||SNR_{window\,size}|^2-|SNR_{window\,size-m+1}|^2 \geq \text{or} \leq \text{threshold}$$ [Equation 3]

Referring to Equation 3, $SNR_m$ denotes the SNR of $m^{th}$ feedback channel while the description of w and m is defined with respect to Equation 1.

By using the processes discussed above, the initial resource allocation method can be determined. Thereafter, the level of change unit can be calculated every time the channel information is fed back. The calculated level of change unit can be compared with a threshold value to determine whether to use Method (1) or Method (2) as the resource allocation method.

That is, the comparison module 161 can select to use Method (1) as the resource allocation method if the level of change unit is smaller than the threshold value pre-stored in the memory 150. Thereafter, the comparison module 161 can transmit information regarding the selected Method (1) to the resource allocator 130. Alternatively, the comparison module 161 can select Method (2) as the resource allocation method if the level of change unit is larger than the threshold value pre-stored in the memory 150. Thereafter, the comparison module 161 can transmit information regarding the selected Method (2) to the resource allocator 130.

In short, Method (1) can be any one of a contiguous allocation scheme, a distributed allocation scheme, or a group allocation scheme, and similarly, Method (2) can be any one of a contiguous allocation scheme, a distributed allocation scheme, or a group allocation scheme, depending on the amount or level of change in power.

Embodiment 2

According to the second embodiment of the present invention, the comparison module 161 can use the level (or amount) of change in the channel condition to calculate the mobility of the receiver (e.g., MS) in order to select the resource allocation method to use. As channel information for calculating the level of change in the channel conditions, power, MCS level index, and SNR can be used. This embodiment relates to power of the channel.

As discussed with respect to the first embodiment, the resource allocation method for initial transmission can be classified into two methods (e.g., Method (1) and Method (2)). Since Method (1) is the same as described in the first embodiment, Method (2) will be further discussed here with respect to the second embodiment.

Within a specified time period (e.g., window size), the comparison module 161 can calculate the average level of change in the channels by dividing the difference between the corresponding channel power, fed back from the receiver, and the stored channel power by a number of feedbacks. The calculated channel change average can then be added or applied to the accumulated channel change average, and this process of accumulation can be repeated to calculate the level of change in window units (hereinafter referred to as "level of change in channel unit"). Furthermore, an average (or average value) can be calculated by calculating the level of change in units repeatedly for a specified duration (hereinafter referred to as "a level of change in initial power").

Here, as is the case in the first embodiment, the pre-stored channel power can be used by various values. As discussed above, the stored channel power level can be represented by previously measured channel power level(s), an average value of a specified number of measured channel power levels, or weighted values (e.g., applying weights to a specified number of measured channel power levels).

The comparison module 161 can select Method (1) as the resource allocation method if the amount of change in initial power is smaller than the threshold value stored in the memory 150. Thereafter, the comparison module 161 can transmit information regarding the selected Method (1) to the resource allocator 130. Alternatively, the comparison module 161 can select Method (2) as the resource allocation method if the amount of change in initial power is larger than the threshold value stored in the memory 150. Thereafter, the comparison module 161 can transmit information regarding the selected Method (2) to the resource allocator 130.

As an example of determining the initial resource allocation method using Method (2), the following Equation 4 can be used.

$$w_1\left(\left|\frac{|h_m|^2-|h_1|^2}{m-1}\right|\right)+w_2\left(\left|\frac{|h_{m+1}|^2-|h_2|^2}{m-1}\right|\right)+w_3\left(\left|\frac{|h_{m+2}|^2-|h_3|^2}{m-1}\right|\right)+\ldots+w_{windowsize-m+1}\left(\left|\frac{|h_{windowsize}|^2-|h_{windowsize-m+1}|^2}{m-1}\right|\right)\geq \text{or} \leq \text{threshold}$$ [Equation 4]

Referring to Equation 4, $h_m$ denotes channel power of the $m^{th}$ feedback channel, w denotes weight, and the sum of w is 1. Moreover, m is an integer between 1–window size, and in particular, if m=2, the equation becomes the same as Equation 1.

If the MCS level is used as channel information for determining the level of mobility of the receiver, Equation 5 can be used instead of Equation 4.

$$w_1\left(\left|\frac{|MCS_m|^2-|MCS_1|^2}{m-1}\right|\right)+w_2\left(\left|\frac{|MCS_{m+1}|^2-|MCS_2|^2}{m-1}\right|\right)+\ldots+w_{windowsize-m+1}\left(\left|\frac{|MCS_{window\,size}|^2-|MCS_{window\,size-m+1}|^2}{m-1}\right|\right)\geq \text{or} \leq \text{threshold}$$ [Equation 5]

Referring to Equation 5, $MCS_m$ denotes the MCS level index of $m^{th}$ feedback channel while the description of w and m is defined with respect to Equation 4.

Further, if the SNR is used as channel information for determining the level of mobility of the receiver, Equation 6 can be used instead of Equation 4.

$$w_1\left(\left|\frac{|SNR_m|^2 - }{|SNR_1|^2}\right|\right) + w_2\left(\left|\frac{|SNR_{m+1}|^2 - }{|SNR_2|^2}\right|\right) + \ldots + w_{windowsize-m+1}\left(\left|\frac{|SNR_{window\ size}|^2 - }{|SNR_{window\ size-m+1}|^2}\right|\right) \geq \text{ or } \leq \text{ threshold}$$ [Equation 6]

Referring to Equation 3, $SNR_m$ denotes the SNR of $m^{th}$ feedback channel while the description of w and m is defined with respect to Equation 4.

By using the processes discussed above, the initial resource allocation method can be determined. Thereafter, the level of change unit can be calculated every time the channel information is fed back. The calculated level of change unit can be compared with a threshold value to determine whether to use Method (1) or Method (2) as the resource allocation method.

That is, the comparison module 161 can select to use Method (1) as the resource allocation method if the level of change unit is smaller than the threshold value pre-stored in the memory 150. Thereafter, the comparison module 161 can transmit information regarding the selected Method (1) to the resource allocator 130. Alternatively, the comparison module 161 can select Method (2) as the resource allocation method if the level of change unit is larger than the threshold value pre-stored in the memory 150. Thereafter, the comparison module 161 can transmit information regarding the selected Method (2) to the resource allocator 130.

Embodiment 3

According to the third embodiment of the present invention, the comparison module 161 can use the distributed value of the channel information to calculate the mobility of the receiver (e.g., MS) in order to determine the resource allocation method. As channel information for calculating the level of change in the channel conditions, power, MCS level index, and SNR can be used. This embodiment relates to MCS level index.

Figure 4A:
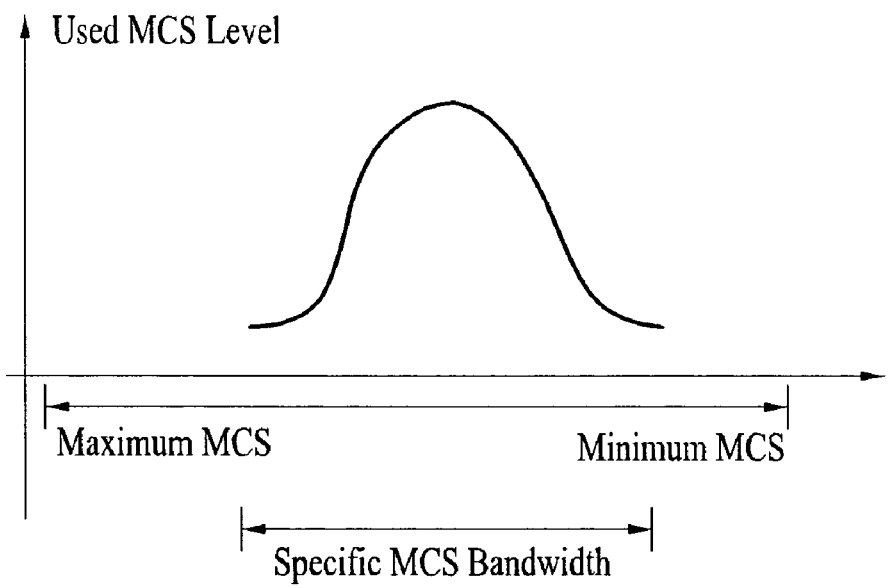
FIG. 4A is an exemplary diagram illustrating the frequency of use of the MCS level index by the receiver versus the mobility of the receiver.
Figure 4B:
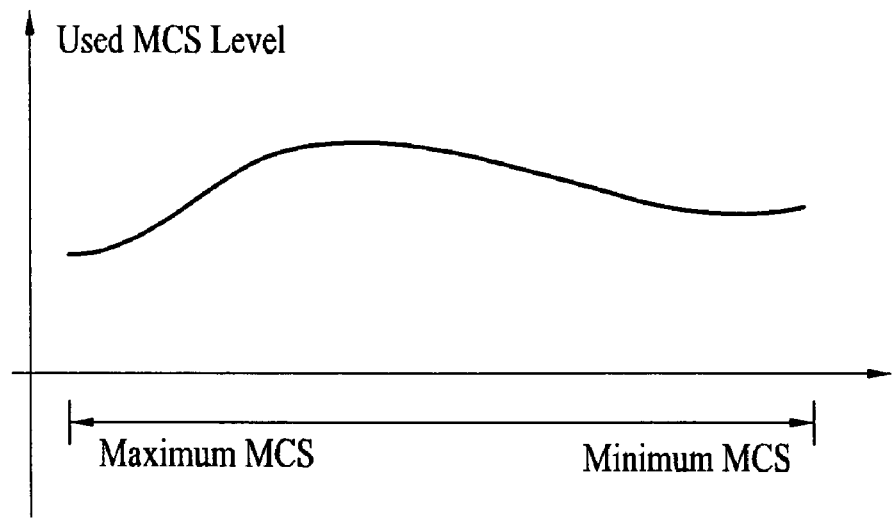
FIG. 4B is another exemplary diagram illustrating the frequency of use of the MCS level index by the receiver versus the mobility of the receiver.

The relationship between the MCS level index feedback from the receiver and the mobility of the receiver can be described with respect to FIGS. 4A and 4B.

FIG. 4A is an exemplary diagram illustrating the frequency of use of the MCS level index by the receiver versus the mobility of the receiver. Referring to FIG. 4A, if the mobility of the receiver low, the diagram illustrates that the MCS level index is actively used during a specified MCS bandwidth. That is, such an occurrence signifies that relatively small number of MCS level index types are used during the specified MCS bandwidth, and thus, resulting in a small distributed value.

FIG. 4B is another exemplary diagram illustrating the frequency of use of the MCS level index by the receiver versus the mobility of the receiver. Referring to FIG. 4B, if the mobility of the receiver high, the diagram illustrates that the MCS level index is spread out throughout the bandwidth, to signify a relatively large number of MCS level index types are used, and thus, resulting in a large distributed value. Moreover, the distributed value of the channel information and the mobility of the receiver are proportional to each other, and the resource allocation method can be determined by calculating the level (or amount) of change in the channel power.

Similar to the first embodiment, the resource allocation method for initial transmission can be classified into two methods (e.g., Method (1) and Method (2)). Since Method (1) is the same as described in the first embodiment, Method (2) will be further discussed here with respect to the third embodiment.

The comparison module 161 can calculate an average value based on the MCS level index received (or fed back) from the receiver during a specified duration (or during a specified unit of time window). Thereafter, the distributed value can be calculated using the difference between the average value and each MCS level index. If the distributed value for the first window is the calculated distributed value, then this distributed value can be referred to as an "initial distributed value."

The comparison module 161 can select Method (1) as the resource allocation method if the amount of change in initial power is smaller than the threshold value stored in the memory 150. Thereafter, the comparison module 161 can transmit information regarding the selected Method (1) to the resource allocator 130. Alternatively, the comparison module 161 can select Method (2) as the resource allocation method if the amount of change in initial power is larger than the threshold value stored in the memory 150. Thereafter, the comparison module 161 can transmit information regarding the selected Method (2) to the resource allocator 130.

As an example of determining the initial resource allocation method, the following Equation 4 can be used.

$$E[(MCS_m - M)^2] = \frac{(MCS_1 - M)^2}{\text{window size}} + \frac{(MCS_2 - M)^2}{\text{window size}} + \ldots + \frac{(MCS_{window\ size} - M)^2}{\text{window size}} \geq \text{ or } \leq \text{ threshold}$$ [Equation 7]

Referring to Equation 7, $MCS_m$ denotes the MCS level index of $m^{th}$ feedback channel, and m is an integer between 1–window size. Moreover, M denotes an average value of a specified number of MCS level indices taken from a duration having a certain window size.

If the MCS level is used as channel information for determining the level of mobility of the receiver, Equation 8 can be used instead of Equation 7.

$$E[(SNR_m - M)^2] = \frac{(SNR_1 - M)^2}{\text{window size}} + \frac{(SNR_2 - M)^2}{\text{window size}} + \ldots + \frac{(SNR_{window\ size} - M)^2}{\text{window size}} \geq \text{ or } \leq \text{ threshold}$$ [Equation 8]

Referring to Equation 8, $h_n$ denotes channel power of the $m^{th}$ feedback channel, m denotes an integer between 1–window size. Moreover, M denotes an average value of a specified number of channel power (or channel power values), taken from a duration having a certain window size.

By using the processes discussed above, the initial resource allocation method can be determined. Thereafter, the level of change unit can be calculated every time the channel information is fed back. The calculated level of change unit can be compared with a threshold value to determine whether to use Method (1) or Method (2) as the resource allocation method.

That is, the comparison module 161 can select to use Method (1) as the resource allocation method if the level of change unit is smaller than the threshold value pre-stored in the memory 150. Thereafter, the comparison module 161 can transmit information regarding the selected Method (1) to the resource allocator 130. Alternatively, the comparison module 161 can select Method (2) as the resource allocation method if the level of change unit is larger than the threshold value pre-stored in the memory 150. Thereafter, the comparison module 161 can transmit information regarding the selected Method (2) to the resource allocator 130.

Embodiment 4

According to the fourth embodiment of the present invention, the comparison module 161 can use a correlation value of each MCS level index correlated by high bound threshold and low bound threshold to calculate the mobility of the receiver (e.g., MS) in order to determine the resource allocation method to use. As channel information for calculating the level of change in the channel conditions, power, MCS level index, and SNR can be used. This embodiment relates to power of the channel.

Figure 5:
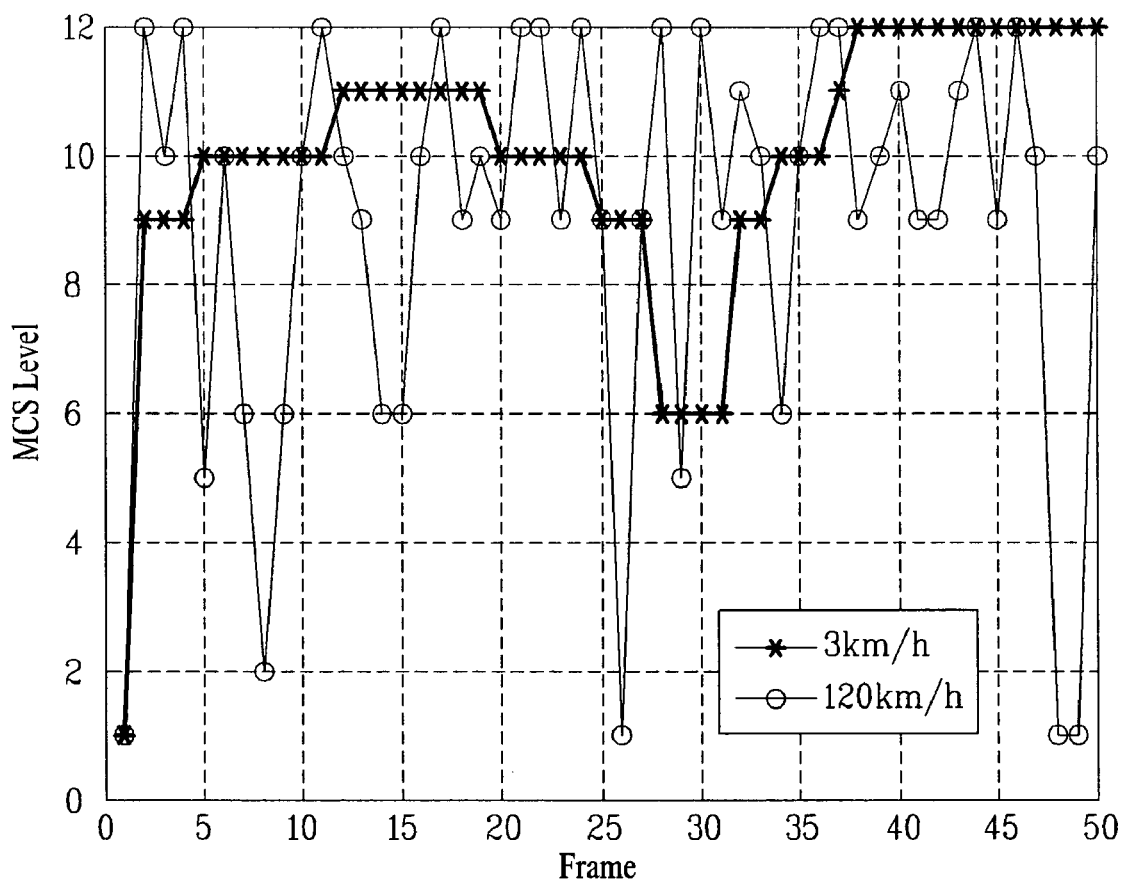
FIG. 5 is an exemplary diagram illustrating the changes in progression of the MCS level indices with respect to time with the speed of the receiver.

The relationship between the correlation value and the mobility of the receiver can be described with respect to FIG. 5.

FIG. 5 is an exemplary diagram illustrating the changes in progression of the MCS level indices with respect to time with the speed of the receiver. Referring to FIG. 5, based on the assumption that the size of a window for measuring the mobility of the receiver is 50 frames, if the mobility of the receiver (or the speed at which the mobility of the receiver occurs) is significant (e.g., 120 km/h), the distribution of the MCS level index ranges from 12 to below 6, and if the mobility of the receiver (or the speed at which the mobility of the receiver occurs) is small (e.g., 3 km/h), then the distribution of the MCS level index ranges between 12 to 6.

The MCS level index fed back during the specified window duration can be stored in the memory 150. As discussed, the comparison module 161 can calculate the correlation value by categorizing the stored MCS level indices as belonging to high bound threshold or low bound threshold.

Generally, if the mobility of the receiver is significant, there are a large number of MCS level indices which cross over between the high bound threshold and the low bound threshold. Hence, the correlation value is greater than if the mobility of the receiver is low.

Further, the comparison module 161 can decide to use Method (1) as the resource allocation method if the calculated threshold value is smaller than the threshold value pre-stored in the memory 150. Thereafter, the comparison module 161 can transmit information regarding the selected Method (1) to the resource allocator 130. Alternatively, the comparison module 161 can select Method (2) as the resource allocation method if the calculated threshold value is larger than the threshold value pre-stored in the memory 150. Thereafter, the comparison module 161 can transmit information regarding the selected Method (2) to the resource allocator 130.

The embodiments 1-4 as described above can be applied to a single antenna system as well as a multiple antenna system, such as multi-input, multi-output (MIMO), multi-input, single-output (MISO), and single-input, multi-output (SIMO).

Embodiment 5

Figure 6:
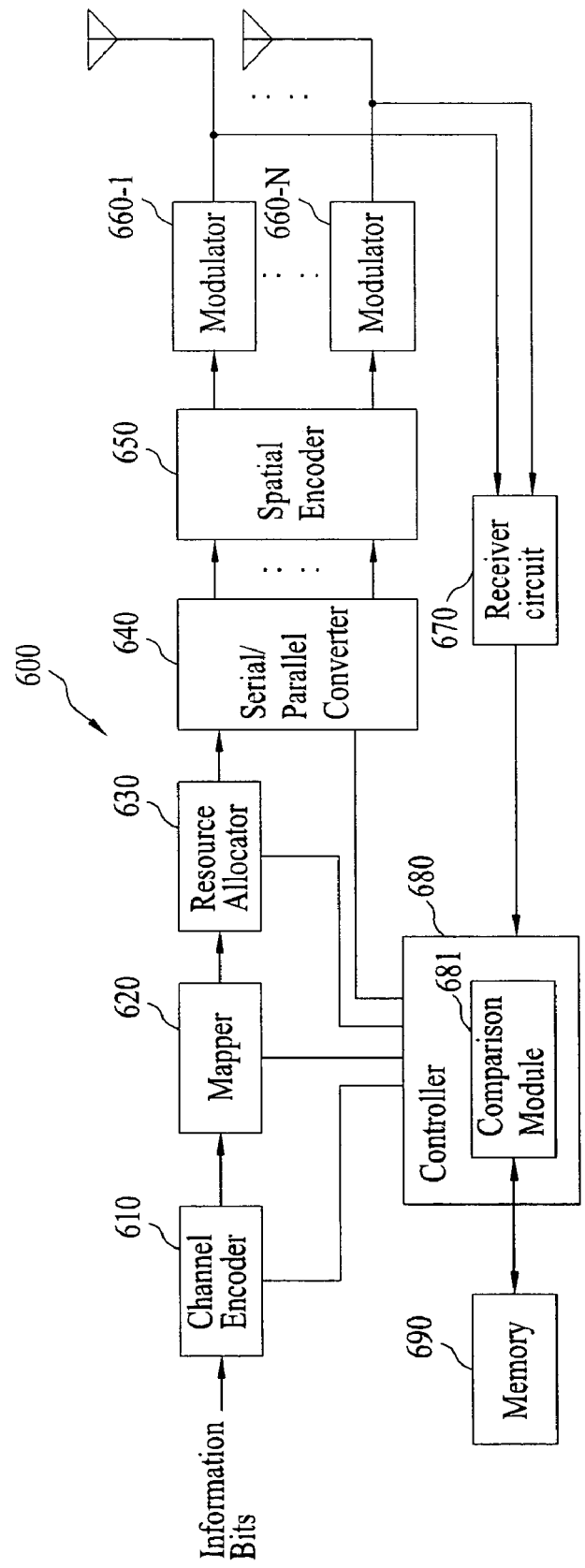
FIG. 6 is an exemplary block diagram illustrating a transmitter of a MIMO system using a single codeword (SCW) with respect to first through fourth embodiments.

FIG. 6 is an exemplary block diagram illustrating a transmitter of a MIMO system using a single codeword (SCW) with respect to first through fourth embodiments. Referring to FIG. 6, a transmitter 600 further comprises, with respect to the transmitter 100 of FIG. 1, a serial/parallel converter 640, a spatial encoder 650, N number of modulators (660-1~660-N), and $N_t$ number of antennas where $N_t \geq 1$. In addition, a channel encoder 610, a mapper 620, a resource allocator 630, a receiver circuit 670, and a memory 690 are included in the transmitter 600 and are the same as described with respect to FIG. 1.

The serial/parallel converter 640 can distribute or assign in parallel serially inputted data to a plurality of antennas. The spatial encoder 650 can encode the data using space-time coding scheme so that the distributed/assigned data can be transmitted via the plurality of antennas. Here, a group of symbols transmitted on one cycle (or one time slot) from the output of the spatial encoder 650 can be referred to as a transmit symbol.

The modulator 660-1~660-N can modulate the output of the spatial encoder 650 using a multiple access modulation scheme and transmits them via each of the plurality of antennas. The modulator 660-1~660-N is not limited to using the multiple access modulation scheme and can also use a single-carrier modulation scheme (e.g., CDMA modulation scheme) or a multi-carrier modulation scheme (e.g., OFDM modulation scheme).

The comparison module 681 of the controller 680 is the same as the comparison module 161 as described in first through fourth embodiments. Here, however, the same resource allocation method can be applied uniformly to all of the plurality of antennas, or since the channel condition for each antenna may vary, independent resource allocation method can be applied per antenna.

Embodiment 6

Figure 7:
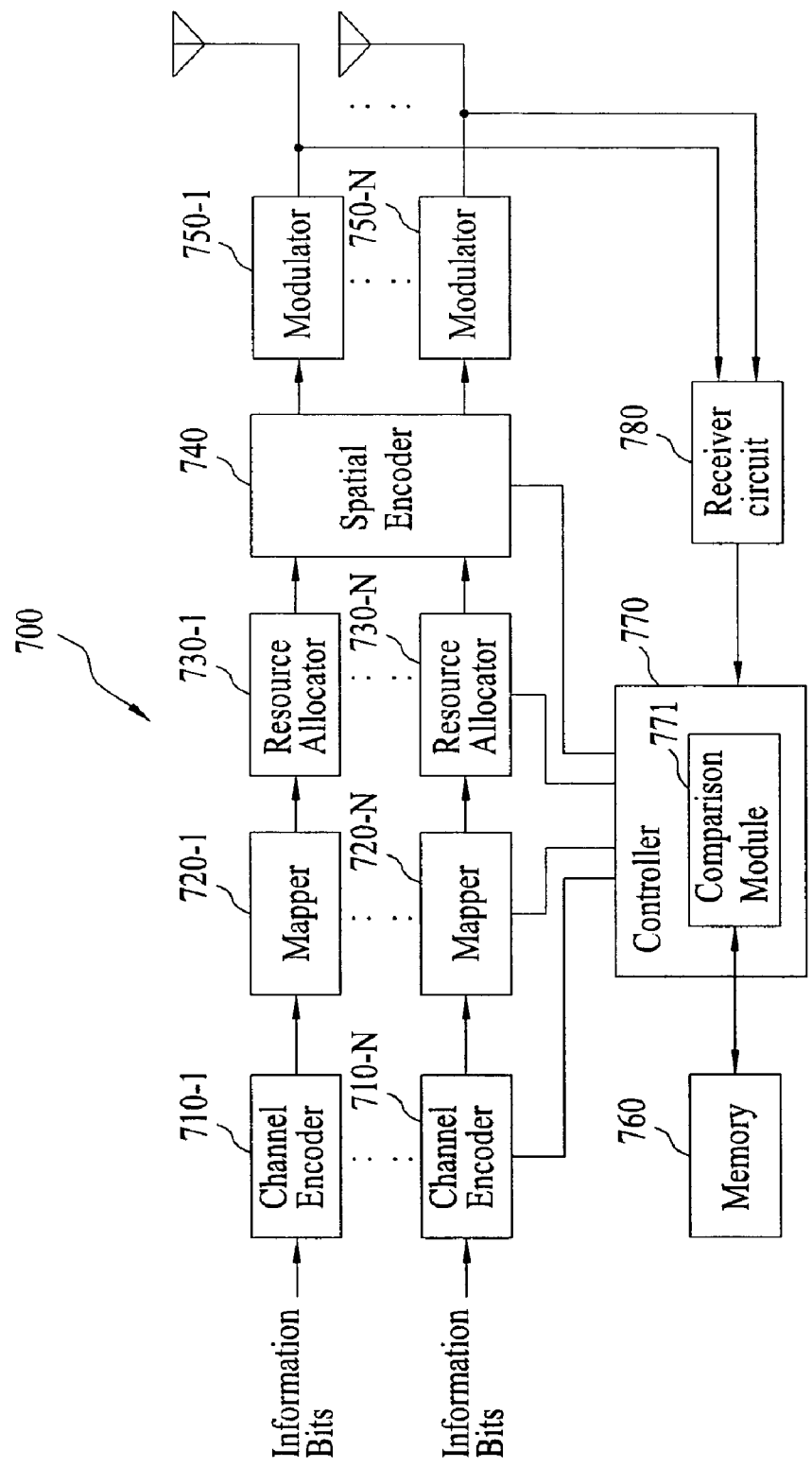
FIG. 7 is an exemplary block diagram illustrating a transmitter of a MIMO system using a multi codeword (MCW) with respect to first through fourth embodiments.

FIG. 7 is an exemplary block diagram illustrating a transmitter of a MIMO system using a multi codeword (MCW) with respect to first through fourth embodiments. Referring to FIG. 7, a transmitter 700 further comprises, with respect to the transmitter 100 of FIG. 1, N number of channel encoders 710-1~710-N, N number of mappers 720-1~720-N, N number of resource allocators 730-1~730-N, a spatial encoder 740, N number of modulators 750-1~750-N, and $N_t$ number of antennas where $N_t \geq 1$. In addition, a receiver circuit 780 and a memory 760 are also included in the transmitter 700 and are the same as described with respect to FIG. 1.

The channel encoders 710-1~710-N can parallelly receive N ($1^{st}$-$N^{th}$) number of mutually exclusive stream of information bits and can encode the received bits according to a prescribed coding scheme to configure coded data. The coding schemes applied to each information bit are independent of each other and as such, different coding schemes can be applied. The channel encoders 710-1~710-N can apply error detection bits (e.g., cyclic redundancy check) to each information bit, and can also apply extra bits for error correction.

The mappers 720-1~720-N can modulate the coded data according to a prescribed modulation scheme, and the modulated coded data become modulated symbols. More specifically, each coded data can be mapped as symbols on corresponding constellation represented by phase and amplitude.

The resource allocators 730-1~730-N can allocate resources to each transmit symbol mapped by the mappers 720-1~720-N according to a specified resource allocation method. Here, the controller can provide the specified resource allocation method.

The spatial encoder 740 can encode the transmit symbols using space-time coding scheme so that the distributed/assigned data can be transmitted via the plurality of antennas.

The modulators 750-1~750-N can modulate the transmit symbols outputted from the spatial encoder 740 using a multiple access modulation scheme and transmits them via each of the plurality of antennas.

The comparison module 771 of the controller 770 is the same as the comparison module 161 as described in first through fourth embodiments. Here, however, the same resource allocation method can be applied uniformly to all of the plurality of antennas, or since the channel condition for each antenna may vary, independent resource allocation method can be applied per antenna.

In the discussion of above with respect to the embodiments of the present invention, the size of the window or the interval of the window can be configured to achieve optimum performance. More specifically, the window size (or the interval of the window) can be represented by a single frame or multiple frames.

Furthermore, the embodiments of above can be performed independently but can also be performed in combination. Lastly, it will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of allocating data to a plurality of subcarriers in a wireless communication system, the method comprising:
receiving feedback information from a receiver;
calculating a level of mobility of the receiver using the feedback information;
determining a resource allocation scheme to use based on the calculated level of mobility; and
allocating the data to the plurality of subcarriers based on the determined resource allocation scheme,
wherein the resource allocation scheme is determined by:

$$w_1(||h_m|^2-|h_1|^2|)+w_2(||h_{m+1}|^2-|h_2|^2|)+w_3(||h_{m+2}|^2-|h_3|^2|)+\ldots+w_{windowsize-m+1}(||h_{windowsize}|^2-|h_{windowsize-m+1}|^2|) \geq \text{ or } \leq \text{ threshold}$$

wherein $h_m$ denotes channel power of an $m^{th}$ feedback channel,
wherein w denotes weight,
wherein a sum of w is 1,
wherein m is an integer between 1–window size, and wherein the window size is an integer larger than 1.

2. The method of claim 1, wherein the resource allocation scheme includes:
calculating amount of change in the level of mobility of the receiver;
if the amount of change in the level of mobility of the receiver is less than a predetermined threshold value, a contiguous allocation scheme is used; and
if the amount of change in the level of mobility of the receiver is greater than the predetermined threshold value, any one of a contiguous allocation scheme, a distributed allocation scheme, or a group allocation scheme is used.

3. The method of claim 1, wherein the resource allocation scheme includes a contiguous allocation scheme, a distributed allocation scheme, and a group allocation scheme.

4. The method of claim 3, wherein the allocation schemes apply frequency or time hopping technique.

5. The method of claim 1, further comprising:
calculating an amount of change in channel power using the feedback information; and
determining a resource allocation scheme to use based on the amount of change in channel power.

6. The method of claim 1, wherein the level of mobility of the receiver is calculated by dividing a difference between a corresponding channel power included in the feedback information and a stored channel power by a number of feedbacks.

7. The method of claim 6, wherein:
if an average level of change is less than a predetermined threshold value, a contiguous allocation scheme is used; and
if the average level of change is greater than the predetermined threshold value, any one of a contiguous allocation scheme, a distributed allocation scheme, or a group allocation scheme is used.

8. The method of claim 1, wherein the level of mobility of the receiver is calculated by using a distributed value included in the feedback information.

9. The method of claim 8, wherein:
if the distributed value is less than a predetermined threshold value, a contiguous allocation scheme is used; and
if the distributed value is greater than the predetermined threshold value, any one of a contiguous allocation scheme, a distributed allocation scheme, or a group allocation scheme is used.

10. The method of claim 1, wherein if a modulation and coding selection (MCS) is used to determine the mobility of the receiver, the resource allocation scheme is determined by:

$$w_1(||MCS_m|^2-|MCS_1|^2|)+w_2(||MCS_{m+1}|^2-|MCS_2|^2|)+\ldots+w_{window\,size-m+1}(||MCS_{window\,size}|^2-|MCS_{window\,size-m+1}|^2| \geq \text{ or } \leq \text{ threshold}$$

wherein $MCS_m$ denotes MCS level index of the $m^{th}$ feedback channel.

11. The method of claim 1, wherein if a signal-to-noise ratio (SNR) is used to determine the mobility of the receiver, the resource allocation scheme is determined by:

$$w_1(||SNR_m|^2-|SNR_1|^2|)+w_2(||SNR_{m+1}|^2-|SNR_2|^2|)+\ldots+w_{window\,size-m+1}(||SNR_{window\,size}|^2-|SNR_{window\,size-m+1}|^2| \geq \text{ or } \leq \text{ threshold}$$

wherein $SNR_m$ denotes SNR of the $m^{th}$ feedback channel.

12. A method of allocating data to a plurality of subcarriers in a wireless communication system, the method comprising:
receiving feedback information from a receiver;
calculating a level of change in channel condition using the feedback information;
determining a resource allocation scheme to use based on the calculated level of change in the channel condition; and allocating the data to the plurality of subcarriers based on the determined resource allocation scheme,
wherein the resource allocation scheme is determined by:

$$w_1\left(\left|\frac{|h_m|^2-|h_1|^2}{m-1}\right|\right)+w_2\left(\left|\frac{|h_{m+1}|^2-|h_2|^2}{m-1}\right|\right)+w_3\left(\left|\frac{|h_{m+2}|^2-|h_3|^2}{m-1}\right|\right)+\ldots+w_{windowsize-m+1}\left(\left|\frac{|h_{windowsize}|^2-|h_{windowsize-m+1}|^2}{m-1}\right|\right) \geq \text{ or } \leq \text{ threshold}$$

wherein $h_m$ denotes channel power of an $m^{th}$ feedback channel,
wherein w denotes weight,
wherein a sum of w is 1, wherein m is an integer between 1–window size, and wherein the window size is an integer larger than 1.

13. The method of claim 12, wherein channel conditions include power, modulation and coding selection (MCS) level index, and signal-to-noise ratio (SNR).

14. The method of claim 12, wherein the level of change is calculated by dividing a difference between a corresponding channel power included in the feedback information and a stored channel power by a number of feedbacks.

15. The method of claim 12, wherein the level of change is an average level of change which is used to calculate mobility of the receiver.

16. The method of claim 15, wherein:
   if the average level of change is less than a predetermined threshold value, contiguous allocation scheme is used; and
   if the average level of change is greater than the predetermined threshold value, any one of a contiguous allocation scheme, a distributed allocation scheme, or a group allocation scheme is used.

17. The method of claim 12, wherein if a modulation and coding selection (MCS) is used to determine the mobility of the receiver, the resource allocation scheme is determined by:

$$w_1\left(\left|\frac{|MCS_m|^2 - |MCS_1|^2}{m-1}\right|\right) + w_2\left(\left|\frac{|MCS_{m+1}|^2 - |MCS_2|^2}{m-1}\right|\right) + \ldots +$$

$$w_{windowsize-m+1}\left(\left|\frac{|MCS_{window\ size}|^2 - |MCS_{window\ size-m+1}|^2}{m-1}\right|\right) \geq \text{ or } \leq \text{ threshold}$$

where $MCS_m$ denotes MCS level index of the $m^{th}$ feedback channel.

18. The method of claim 12, wherein if a signal-to-noise ratio (SNR) is used to determine the mobility of the receiver, the resource allocation scheme is determined by:

$$w_1\left(\left|\frac{|SNR_m|^2 - |SNR_1|^2}{m-1}\right|\right) + w_2\left(\left|\frac{|SNR_{m+1}|^2 - |SNR_2|^2}{m-1}\right|\right) + \ldots +$$

$$w_{windowsize-m+1}\left(\left|\frac{|SNR_{window\ size}|^2 - |SNR_{window\ size-m+1}|^2}{m-1}\right|\right) \geq \text{ or } \leq \text{ threshold}$$

wherein $SNR_m$ denotes SNR of the $m^{th}$ feedback channel.

* * * * *